Patented July 20, 1926.

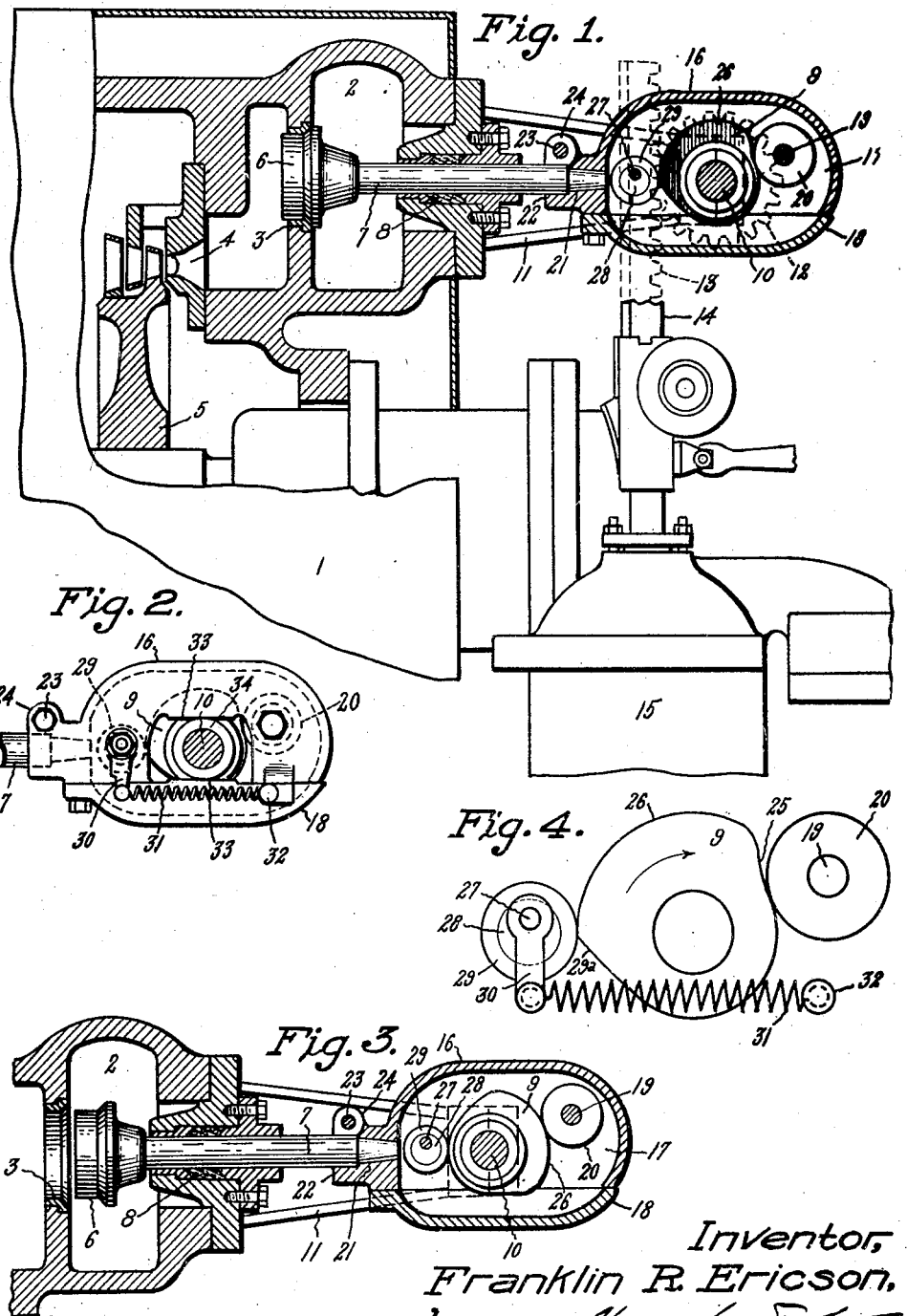

1,593,396

UNITED STATES PATENT OFFICE.

FRANKLIN R. ERICSON, OF BEVERLY, MASSACHUSETTS, ASSIGNOR TO GENERAL ELECTRIC COMPANY, A CORPORATION OF NEW YORK.

VALVE MECHANISM.

Application filed February 20, 1925. Serial No. 10,701.

The present invention relates to valve mechanisms such as are used to control the admission of elastic fluid to turbines for example, and has for its object to provide an improved mechanism for actuating such valves which is positive in operation in both directions, and in which there will be no back lash.

For a consideration of what I believe to be novel and my invention, attention is directed to the accompanying description and the claims appended thereto.

In the drawing, Fig. 1 is a side elevation of a part of a turbine equipped with a valve mechanism embodying my invention, certain parts being broken away and others being shown in section; Fig. 2 is a detail side view of certain parts; Fig. 3 is a detail sectional view of the valve mechanism showing it in open position and Fig. 4 is a diagram.

Referring to the drawing, 1 indicates an elastic fluid turbine of suitable structure provided with a chest 2 to which elastic fluid is supplied by a suitable pipe (not shown) and from which elastic fluid flows through one or more ports 3 to the nozzles 4 which direct the elastic fluid to the buckets on the bucket wheel 5. Only the high pressure end of the turbine is shown in the drawing. It will be understood that the arrangement shown is to be taken as typical of any suitable turbine structure. The flow of elastic fluid through each port 3 is controlled by a valve 6 the stem 7 of which extends through a stuffing box 8 to the outside of the turbine casing. In general, in a turbine of the type illustrated, there are several valves 6 which are opened and closed one after another to control the admission of elastic fluid to the turbine. Each valve is opened by a cam 9 on a cam shaft 10 journaled in bearings in suitable brackets, one of which is shown at 11. Cam shaft 10 is turned by a gear wheel 12 which meshes with a rack 13 on the upper end of a rod 14. The lower end of rod 14 is connected to the piston of the hydraulic motor 15. The hydraulic motor is shown only partially and in outline. It will be understood that it may be any desired or known type including the usual pilot valve which is moved by the turbine speed governor.

The present invention relates particularly to the connection between valve stem 7 and cam 9 through which the cam operates the valve. Connected to the outer end of stem 7 is a curved housing 16 having side walls 17 and an open front which is closed by a cover plate 18. Pivoted between side walls 17 on a pin 19 is a roller 20 with which the cam 9 engages to open valve 6. Housing 16 may be fastened to stem 7 in any suitable manner, it being shown in the present instance as being provided with a socket 21 into which the end of the stem fits and with a split sleeve 22 which is tightened around the stem by a bolt 23 which passes through ears 24 on the sleeve. Cam 9 has a lifting surface 25 and a holding surface 26, the center of curvature of the latter being the center of shaft 10. With this arrangement when shaft 10 turns in a direction indicated by the arrow in Fig. 4, valve 6 is first raised by lifting surface 25 and, after being fully opened, is held open by surface 26. Surface 26 has considerable circumferential extent so that it will hold the valve open while shaft 10 continues to turn to open additional valves.

Journaled in walls 17 on the side of cam 9 opposite to roller 20 is a shaft 27 on which is fixed an eccentric hub 28, and mounted on hub 28 is a roller 29 with which a cam surface 29ª in cam 9 engages. On one end of shaft 27 is fixed an arm 30 the outer end of which is connected by a spring 31 to a button 32 on cover plate 18 and, as will be clear from an inspection of Figs. 2 and 4, this spring acts to turn shaft 27 and eccentric 28 in a direction to hold roller 29 always in engagement with the surface of cam 9. On housing 16 and cover plate 18 are flat surfaces 33 which engage a roller 34 on the side of cam 9 and serve to transmit side thrusts from the housing and stem 7 to brackets 11.

With the above described arrangement, when cam 9 is moved in the direction indicated by the arrow in Fig. 4, lifting surface 25 acting on roller 20 serves to open valve 6, and during this opening movement roller 29 follows along the surfaces of cam 9 and is maintained in engagement therewith by spring 31. Now when cam 9 is moved in the opposite direction to close valve 6, it will act directly on roller 29 so as to move the valve positively toward closed position. Since roller 29 is maintained directly in contact with the surface of cam 9 by spring 31, there will be no back lash and the cam will act positively and accurately in closing the valve the same as it does in opening it. Also since there is no back lash, there is no danger of the valve chattering.

The construction has the substantial advantage that it provides for the positive operation of the valve in both directions thereby avoiding the necessity of using a spring for biasing the valve toward closed position, the only spring required being that for holding roller 29 in engagement with cam 9. This can be a comparatively light spring and imposes no load or side thrusts on the mechanism. In addition, the apparatus is simple in construction and can be built at a low cost.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a valve mechanism, the combination of a valve having a stem, spaced rollers carried by the stem, one of said rollers being eccentrically mounted, a cam which fits between said rollers and is provided with surfaces for engaging them to move the valve positively in both directions, and yielding means which biases said eccentrically-mounted roller toward the cam surface whereby it is always in engagement with the cam surface.

2. In a valve mechanism, the combination of a valve having a stem, spaced rollers carried by the stem, one of said rollers being eccentrically mounted, a cam which fits between said rollers and is provided with surfaces for engaging them to move the valve positively in both directions, and a spring connected to said eccentrically-mounted roller for biasing it toward the surface of the cam.

3. In a valve mechanism, the combination of a valve having a stem, a head on the stem, spaced rollers in the head, one of said rollers being eccentrically mounted, a cam located between said rollers and having surfaces for engagement with each of them for opening and closing the valve, and yielding means which biases said eccentrically-mounted roller toward the cam surface whereby it is always in engagement with a cam surface.

4. In an apparatus of the character described, the combination with a stem, of means for moving it positively comprising spaced rollers carried by the stem, one of said rollers having a shaft upon which it is eccentrically mounted, a cam located between the rollers and having surfaces for engagement with the rollers, and means connected to said shaft which tends to turn it always in a direction to maintain the eccentrically-mounted roller in engagement with the cam.

5. In an apparatus of the character described, the combination with a stem, of means for moving it positively comprising spaced rollers carried by the stem, one of said rollers having a shaft upon which it is eccentrically mounted, a cam located between the rollers and having surfaces for engagement with the rollers, an arm fixed on the shaft, and yielding means connected to the arm which tends to turn the shaft in a direction to maintain the eccentrically-mounted roller in engagement with the cam.

6. The combination with a stem to be reciprocated, of two spaced rollers carried by the stem, a shaft having an eccentric hub upon which one of said rollers is mounted, an actuating cam located between said rollers, and means connected to said shaft which tends to turn it in a direction such that the eccentric hub holds the one roller always in contact with the cam.

In witness whereof, I have hereunto set my hand this eighteenth day of February, 1925.

FRANKLIN R. ERICSON.